United States Patent [19]

Baumann et al.

[11] 4,340,880

[45] Jul. 20, 1982

[54] METHOD AND APPARATUS FOR SIGNAL RECOGNITION IN A REMOTE CONTROL SYSTEM WITH INFLUENCING OF THE ZERO POINT TRANSITION OF THE ALTERNATING-CURRENT MAINS VOLTAGE

[75] Inventors: Eduard Baumann; Roger Kniel, both of Uster, Switzerland

[73] Assignee: Zellweger Limited, Uster, Switzerland

[21] Appl. No.: 185,425

[22] Filed: Sep. 9, 1980

[30] Foreign Application Priority Data

Oct. 12, 1979 [CH] Switzerland ............... 9210/70

[51] Int. Cl.³ ............................................. H04B 3/54
[52] U.S. Cl. ................................. 340/310 R; 328/151
[58] Field of Search ........ 340/310 R, 310 A, 149 SN; 307/354, 149; 328/135, 150, 151

[56] References Cited

U.S. PATENT DOCUMENTS

| | | | |
|---|---|---|---|
| 3,315,169 | 4/1967 | Nitta et al. ...................... | 328/135 |
| 3,594,584 | 7/1971 | Woods ............................. | 340/310 A |
| 3,818,466 | 6/1974 | Honda ............................. | 340/310 R |
| 3,895,369 | 7/1975 | Ono et al. ....................... | 340/310 R |
| 4,106,007 | 8/1978 | Johnston et al. ................ | 340/310 A |
| 4,126,793 | 11/1978 | de Vries ......................... | 340/310 A |
| 4,131,882 | 12/1978 | Hollabaugh et al. ........... | 340/310 A |
| 4,222,035 | 9/1980 | Lohoff ............................. | 340/310 A |
| 4,254,403 | 3/1981 | Perez-Cavero et al. ......... | 328/151 |

FOREIGN PATENT DOCUMENTS

| | | | |
|---|---|---|---|
| 30816 | 6/1981 | European Pat. Off. ........ | 340/310 R |
| 2008299 | 5/1979 | United Kingdom ........... | 340/310 R |

*Primary Examiner*—Gerald L. Brigance
*Attorney, Agent, or Firm*—Werner W. Kleeman

[57] ABSTRACT

In a remote control system which generates a remote control signal by a temporary short-circuit on the secondary side of a transformer during an influencing period or time span about a zero point transition of the alternating-current mains voltage, a considerable improvement in the receiver-side recognition or detection of the remote control signal can be accomplished by a different determination, in relation to the prior art, of the receiver-side comparison period as concerns its start and duration. There is correlated the comparison period to the course of the receiver-side alternating-current mains voltage before the mains voltage zero transition to be monitorerd. This system may be used in remote control technology using signal transmission on a power supply network.

22 Claims, 8 Drawing Figures

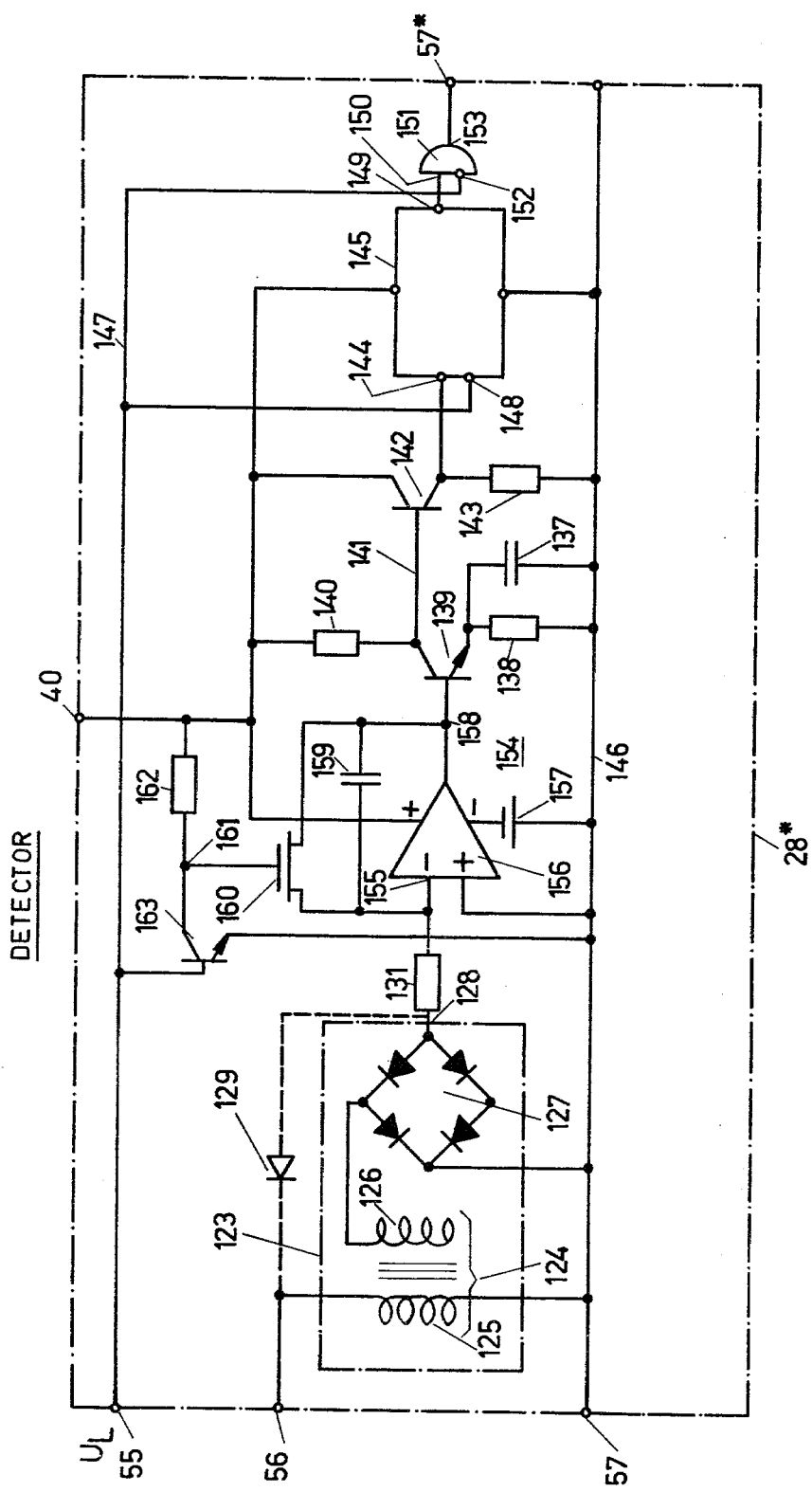

METHOD AND APPARATUS FOR SIGNAL RECOGNITION IN A REMOTE CONTROL SYSTEM WITH INFLUENCING OF THE ZERO POINT TRANSITION OF THE ALTERNATING-CURRENT MAINS VOLTAGE

BACKGROUND OF THE INVENTION

The present invention relates to a new and improved method of, and apparatus for, signal recognition in a remote control system, wherein on the transmission-side or transmission-end of the system, the remote control signal is produced by a desired or intentional influencing of the voltage course during an influencing period or time span in a region about at least one zero point transition or zero cross-over of the transmitter-end alternating-current mains voltage, such is impressed and transmitted via a power supply network and, at the reception-side or receiver-end of the system, the appearance of such a remote control signal is accomplished by comparing the receiver-end alternating-current mains voltage, during certain comparison periods or time spans, at the region of receiver-end alternating-current mains voltage zero point transitions or cross-overs. A remote control system of this type is known, for example, by the name of CYCLOCONTROL; see for example the article "Use of London's Electricity Supply System for Centralised Control; by A. J. Baggot, B. E. Eyre, G. Fielding, F. M. Gray; PROCEEDING IEE, Vol 125 No. Apr. 4 1978, pages 311 to 327", particularly paragraphs 5.2 to 5.3.4.

According to the prior art, in remote control systems of the type here under consideration, in order to produce a remote control signal on the transmission-side or transmitter-end, the course of the mains voltage in the region of zero point transition of the, for example, 50 Hz alternating-current voltage curve, is temporarily changed such that on each phase of the secondary side of a medium voltage transformer, a short-circuit load is produced by temporarily switching-on a thyristor for each phase. This pulsatory or surge-like load takes place, for example, during an influencing period or time-span ranging from minus to plus 25 electric degrees about at least one zero point transition or zero cross-over of the alternating-current mains voltage curve.

As a result of this pulsatory load in the medium voltage transformer, there is produced an influence on the alternating-current mains voltage curve. This influence, for example, appearing as a deviation from the sinusoidal form, constitutes the remote control signal. The remote control signal is impressed, as explained above, upon the alternating-current mains voltage and is transmitted in the connected and also superimposed power supply network.

At this power supply network, for example via other transformers, receivers connected at the erection site of remote controlled energy consumers or loads, evaluate the mains voltage which has been distorted by the mentioned influence i.e. they respond to thus produced remote control signal.

Heretofore known receiving methods and receivers are based upon monitoring, for example integrating the receiver-side course of the mains voltage in each case from a zero point transition of the receiver-side mains voltage during a time span from half the value of the influencing period and comparing the integration result with integration values which are previously obtained in the same manner. The integration results are normally different, depending on whether at an evaluated zero point transition at the transmitter-end, there has or has not been an influence of the type described.

Therefore, the presence of a remote control signal is recognised at the receiver-end from the differing integration results and this signal may be further evaluated in a known manner, for example in a decoding device. In this connection, see, for example, the above-quoted article.

Remote control systems are known in which in order to transmit a piece of information, the temporal sequence of the zero transition of the mains voltage, is temporarily changed. In another known system, in order to mark a signal the value of the mains voltage is influenced at a certain point in the cycle, e.g. shortly before until shortly after the zero cross-over, for instance during the transition from a positive to a negative voltage half-wave. This last-mentioned process has, in particular, the advantage that there can be used simpler influencing means, or, expressed in other words, has the advantage of particularly simple transmitters. For a three-phase network or mains, they may essentially consist of three thyristors connected from each one of the phases to the neutral conductor. These thyristors are switched-on shortly before the zero point transition or cross-over of the voltage from the positive to the negative half-wave. The thyristor firing leads to a breakdown of the voltage at the relevant phase and to the formation of a short-circuit current. This short-circuit current which, in practise, is mostly inductive, again reaches the value of zero relatively shortly after the zero point transition of the supplying voltage, whereupon the thyristor automatically is extinguished and the voltage jumps back to the uninfluenced value. The signal consisting of the change in voltage in the region of this zero point transition is propagated over the entire mains. The described process, in particular, has an effect upon the supplying superimposed mains, so that the signal may also be received in neighbouring mains regions. The receivers for a transmission system of this type are constructed, for example, in such a manner that they integrate for a brief period of time the mains voltage after each zero point transition from the positive to the negative voltage half-wave which is triggered by the zero point transition itself, and they store the result until the next zero point transition from the positive to the negative half-wave. If the voltage curve remains uninfluenced, i.e. if no remote control signal is produced on the transmission side of the system, then the renewed integration practically reproduces the value which was previously obtained. However, if the alternating-current mains voltage was influenced, i.e. reduced on the transmission side or transmitter-end of the system in the previously described manner, then the integration now produces a noticeably lower value. This lower value is interpreted by the receiver as a remote control signal, for example by difference formation or subtraction.

Remote control receivers of this type have the serious disadvantage that, under certain circumstances, they repeatedly miss remote control signals. This is so because between the mains voltage at the transmission site and the mains voltage at the receiver site, governed by the presently prevailing mains configuration and mains load situation, considerable phase differences may exist, so that the transmission time derived from the mains voltage curve at the transmission site possibly no longer agrees, in the required manner, with the evaluation time also derived from the mains voltage curve at the receiver site. The signal pulse constituted by the described voltage reduction at the transmission site also not only experiences an attenutation or damping, but also a distortion by the lines, transformers, capacitors and the loads which are present in the mains. Particularly, where there is a small mains load, transients may occur, especially with relatively short evaluation times, which, although a remote control signal is transmitted, i.e. reducing the voltage at the transmission site in the region of a zero point transition, may lead to a result being produced at the receiver-end during the evaluation period in the receiver which is the same as for a transmission-site uninfluenced voltage curve.

SUMMARY OF THE INVENTION

Therefore, an important object of the present invention is to overcome the above-mentioned disadvantage and, in particular, to provide a simple method for recognising a remote control signal of the mentioned type, wherein, on the receiver-end of the system there is rendered possible a reliable recognition of remote control signals impressed upon the power network on the transmission side of the system practically independent of the momentary mains configuration and mains load situation.

Another important object of the invention aims at the provision of an apparatus for implementing the inventive method, wherein through the use of simple means the reliability of the recognition of remote control signals is considerably increased with respect to the prior art, practically independent of the relevant mains conditions.

Thus, according to one aspect of the present invention there is provided a method for signal recognition in a remote control system, wherein at the transmitter-end of the system a remote control signal is produced by intentionally influencing the voltage course during a transmission side or transmitter-end influencing period in a region about at least one zero point transition or cross-over of the transmitter-end alternating-current mains voltage. The thus produced remote control signal is impressed upon the alternating-current mains voltage and transmitted over the power supply network. At the receiver-end of the system there is determined the occurrence of such a remote control signal by comparing the receiver-end alternating-current mains voltage during certain comparison time periods in the region of the receiver-end alternating-current mains voltage zero point transition or cross-over. Importantly, the comparison periods commence in each case before the expected theoretical zero transition of the alternating-current mains voltage.

According to a further aspect of the present invention there is also provided an apparatus for signal recognition in a remote control system, which comprises a remote control receiver provided with a clock generator for controlling a receiver-end comparison period dependent upon the course of the receiver-end alternating-current mains voltage before the zero point transition or cross-over of the receiver-end alternating-current mains voltage which is to be monitored.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various Figures the same reference characters have generally been used for the same components, and wherein:

FIG. 8 shows a block circuit diagram of a second emodiment of a detector.

DETAILED DESCRIPTION OF THE PREFERRED EMBODIMENTS

Figure 1:
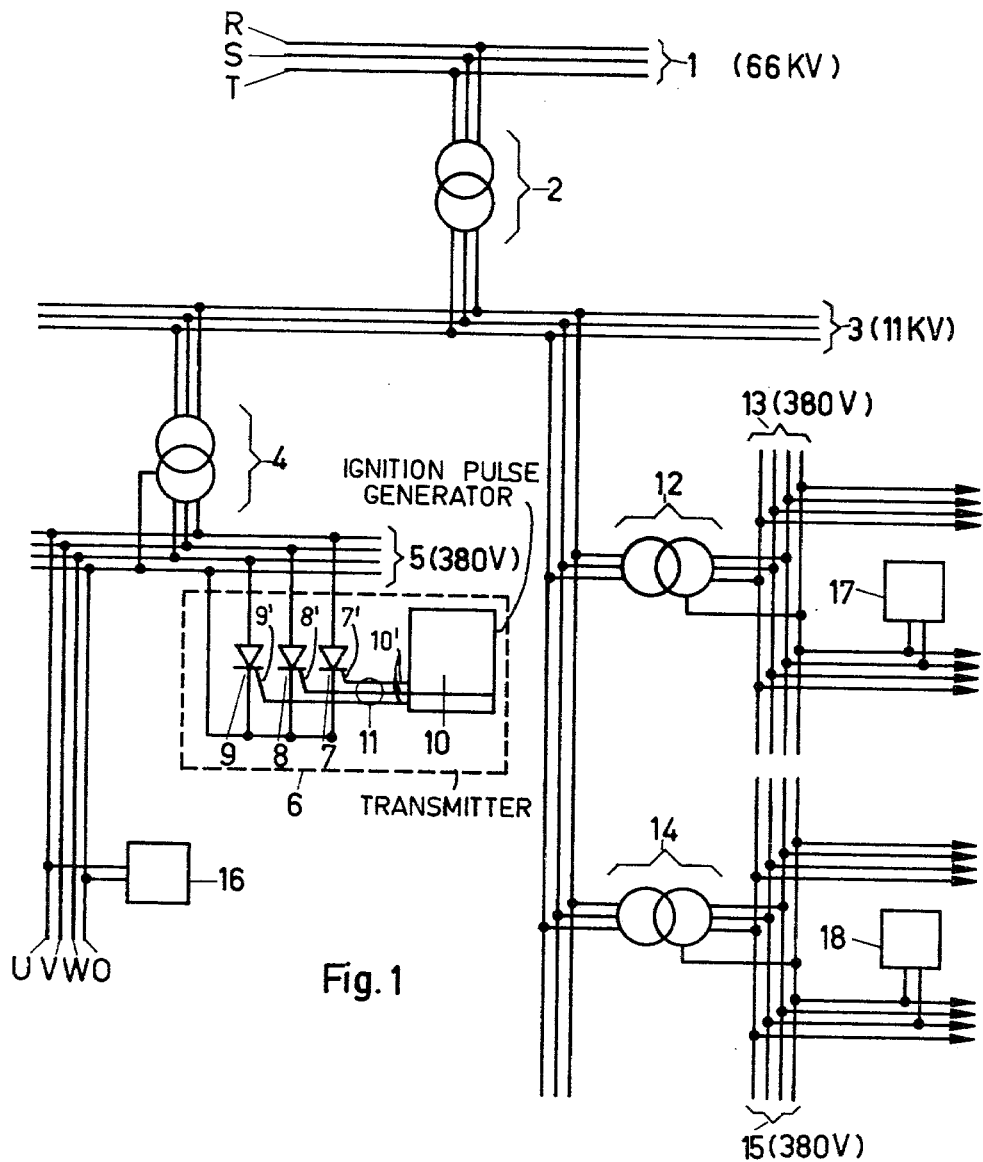
FIG. 1 schematically shows a power grid or network employing a method according to the invention.

Describing now the drawings, FIG. 1 schematically shows a power supply network in which there is employed the method according to an embodiment of the invention. A high-voltage mains or network 1 of, for example, 66 kV, with phase lines or conductors R, S, T, is connected to a medium-voltage mains or network 3 of, for example, 11 kV by means of a high-voltage/medium-voltage transformer 2. A low-voltage mains or network 5 of, for example, 380 V, is connected via a medium-voltage/low-voltage transformer 4 to the medium-voltage mains or network 3. The phase conductors or lines of the low-voltage mains 5 are indicated by U, V, W and its neutral conductor by reference character 0.

A remote control transmitter 6 is connected to the low-voltage mains 5. This transmitter 6 comprises three thyristors 7, 8 and 9 and an ignition pulse generator 10. Thyristor 7 is arranged between the phase conductor U and the neutral conductor O, thyristor 8 is arranged between the phase conductor V and the neutral conductor 0, and thyristor 9 is arranged between phase conductor W and the neutral conductor O.

The ignition of firing electrodes 7', 8' and 9' of the thyristors 7, 8 and 9, respectively, are connected to the ignition outputs 10' of the ignition pulse generator 10 by means of the ignition lines 11.

A second low-voltage mains 13 is connected to the medium-voltage mains 3 via another medium-voltage/low-voltage transformer 12 and a further low-voltage mains 15 is connected via yet a further medium-voltage/low-voltage transformer 14.

Between a neutral conductor and any phase conductor U, V or W in the low-voltage mains 5, 13 and 15 there may be connected remote control receivers 16, 17 and 18, respectively. By means of these remote control receivers 16, 17 and 18, it is possible in accordance with received remote control commands, to connect or disconnect from these low-voltage mains 5, 13 and 15, by remote control, loads or consumers which are connected with the related low-voltage mains 5, 13 and 15.

Figure 2:
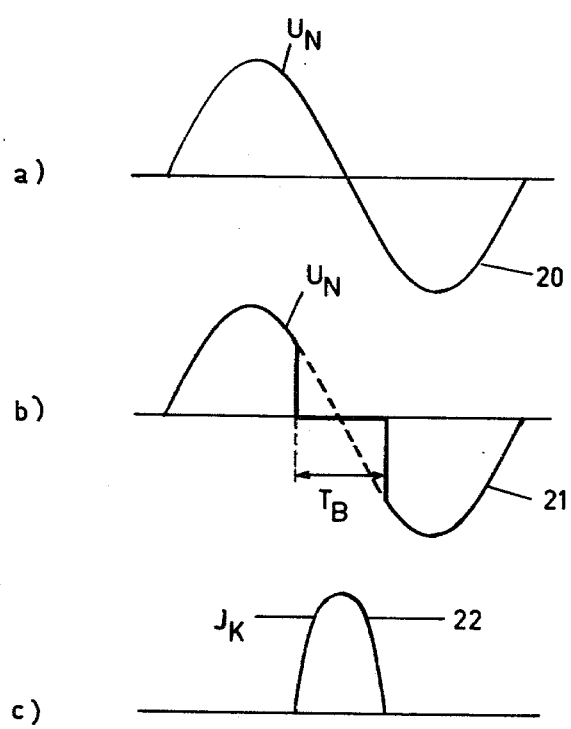
FIG. 2a shows the normal sinusoidal shaped course of the alternating-current mains voltage at the transmission site or transmitter-end of the system.
FIG. 2b shows the influence of the alternating-current mains voltage course at the transmission site or transmitter-end of the system at the region of a zero point transition or zero cross-over.
FIG. 2c shows a possible course of the short-circuit current produced as a result of the influence.

FIG. 2a shows the normal sinusoidal shaped course 20 of an alternating-current mains voltage $U_N$ at the transmission site or transmitter-end of the system, and thus, for example, at each phase of the low-voltage mains or network 5 (FIG. 1).

FIG. 2b shows the voltage course 21 at the transmission site or transmitter-end as it is produced by the described influence during an influencing time span or period $T_B$.

Finally, FIG. 2c shows a possible short-circuit current pulse 22 as it occurs in each of the phases U, V, W of the low-voltage mains or network 5 when the relevant thyristor 7, 8 or 9 is temporarily switched-on.

Figure 3:
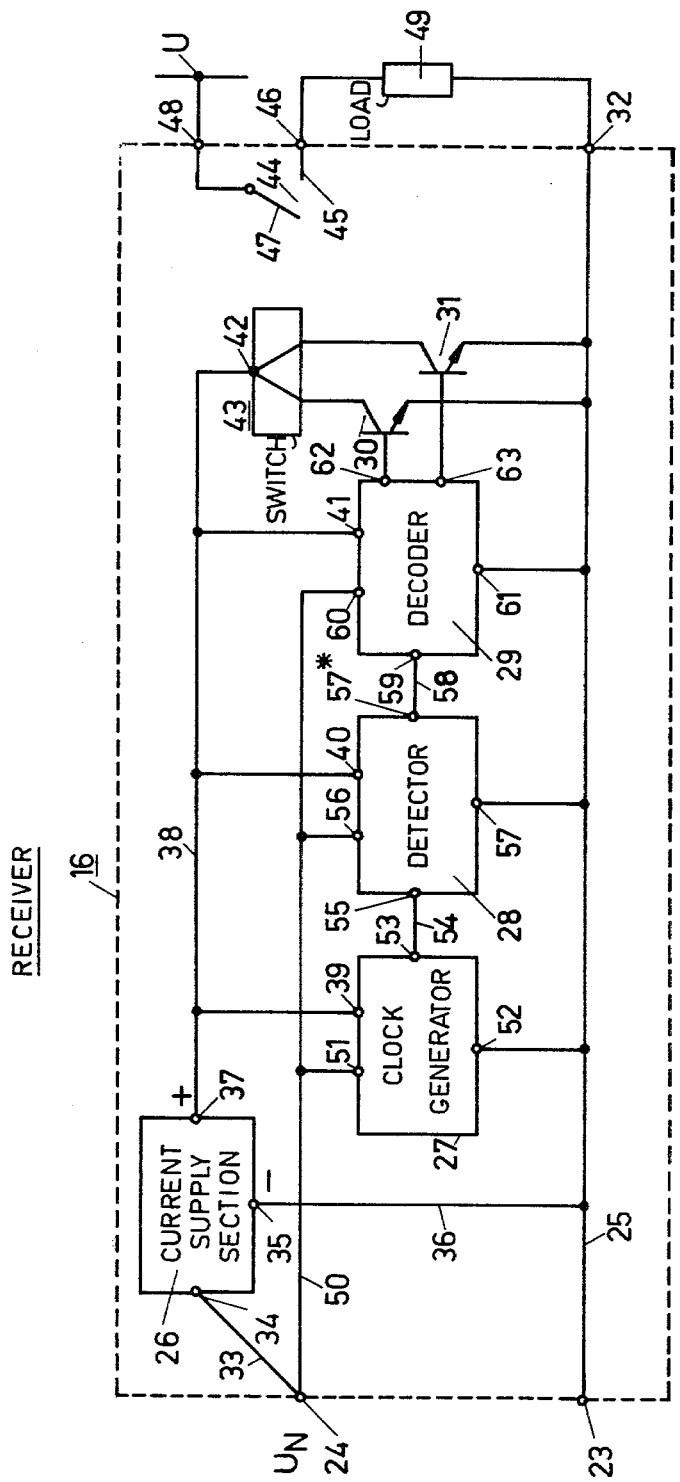
FIG. 3 shows a block circuit diagram of a remote control receiver.

FIG. 3 shows a block circuit diagram of a remote control receiver, such as any one of the receivers 16 or 17 or 18, which is suitable for the reception and evaluation of the previously mentioned remote control signals. The remote control receiver 16 comprises a first input terminal 23, which is connected, for example, to the neutral conductor 0 of the low-voltage mains 5 (FIG. 1) and a second input terminal 24 which is connected, for example, to the phase conductor U of the low-voltage mains 5 (FIG. 1). A conventional current supply section or component 26, a clock generator 27, a detector 28, a decoder 29, a first switching transistor 30, a second switching transistor 31 and a first output terminal 32 are connected together via a line or conductor which is characterised in the following as a negative bus 25.

The mains voltage $U_N$, at the second input terminal 24 of the remote control receiver 16 is supplied to the input terminal 34 of the current supply section 26 via a line 33. The negative terminal 35 of the current supply section 26 is connected to the negative bus 25 via a conductor 36. A positive bus 38 leads from the positive terminal 37 of the current supply section 26 to a positive supply terminal 39 of the clock generator 27, to a positive supply terminal 40 of the detector 28, to a positive supply terminal 41 of the decoder 29 and to a supply junction or point 42 of a switching member 43 which is provided with a power contact 44 and designed, by way of example, as a bistable relay.

One contact 45 of the power contact 44 is connected to a second output terminal 46 of the remote control receiver 16 and the other contact 47 of the power contact 44 is connected to a phase conductor, for example the phase U of the low-voltage mains 5 (FIG. 1) via a third output terminal 48 of the remote control receiver 16. It will be seen that when the power contact 44 is closed, a current load or consumer 49 is connected to the low-voltage mains 5, whereas when the power contact 44 is open, there is a disconnection from the low-voltage mains 5.

It is now the task of the remote control receiver 16 to recognise, receive and evaluate remote control signals of the described type and depending upon the information content of the remote control signal, to connect the current load or consumer 49 to the low-voltage mains or network 5 or to disconnect it from this mains 5 by appropriately exciting or energizing the switching member 43.

Current supply components or sections 26 which are suitable for remote control receivers are well known in the art, for example, as disclosed in the textbook: "Halbleiter-Schaltungstechnik", Tietze/Schenk, Springer-Verlag, Berlin, Heidelberg, New York 1978, chapter 16.

The mains voltage $U_N$ is supplied to the clock generator 27 via a line 50 leading from the second input terminal 24 of the remote control receiver 16 to an input terminal 51 of such clock generator 27. The negative terminal 52 of the clock generator is connected to the negative bus 25, and thus, also connected to the neutral conductor 0 of the low-voltage mains 5 via the first input terminal 23 (FIG. 1). The clock generator 27 derives clock pulses from the mains voltage $U_N$ supplied to it. These clock pulses are supplied to a clock input 55 of the detector 28 from the output terminal 53 of the clock generator via a line 54. Embodiments of the clock generator 27 will be described in greater detail hereinafter.

The mains voltage $U_N$ possibly with a superimposed remote control signal $U_S$ is also supplied to the input terminal 56 of the detector 28 via line or conductor 50. A negative terminal 57 of the detector 28 is connected to the negative bus 25. An output terminal 57* of the detector 28 outfeeds the received remote control signal $U_S$ in the form of a logical signal $U_S$ via line 58. This output signal $U_S$ is delivered from the output terminal 57* of the detector 28 via the line or conductor 58 to an input terminal 59 of the decoder 29 and is decoded in this decoder. The mains voltage $U_N$ is also supplied to the decoder 29 via line 50 to another input terminal 60 thereof. The negative terminal 61 of the decoder 29 is connected to the negative bus 25.

As the occasion arises the decoder 29 delivers a control signal for the first switching transistor 30 at a first output terminal 62 thereof. Furthermore, the decoder 29 delivers, as required, a control signal for the second switching transistor 31 at a second output terminal 63 thereof. As a result, the switching member or switch means 43 is moved into a first or second position, as the case may be, and connects or disconnects the current load or consumer 49 via the power contact 44.

Decoders 29 suitable for the purposes of the invention are known, for example, from Swiss Patent No. 566,086 and its corresponding U.S. Pat. No. 3,986,121, granted Oct. 12, 1976, and German Patent No. 1,166,333, to which reference may be had and the disclosure of which is incorporated herein by reference.

Figure 4:
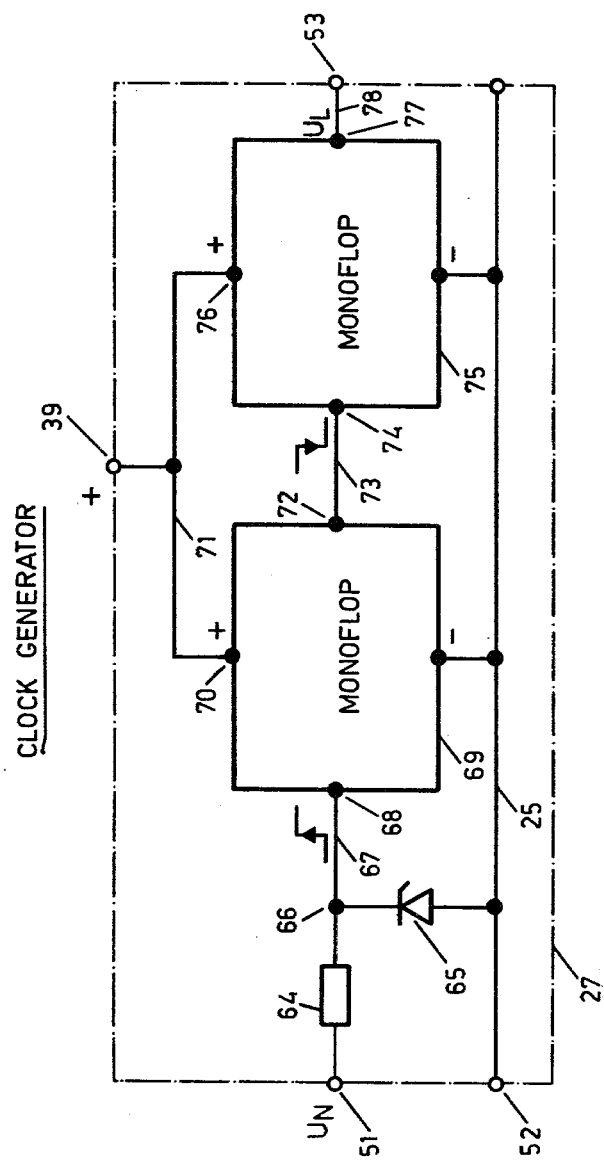
FIG. 4 shows a block circuit diagram of a first embodiment of a clock generator for a remote control receiver according to FIG. 3.

A first embodiment of a clock generator 27 will now be described with reference to FIG. 4. The mains voltage $U_N$ is applied between the input terminal 51 and the negative terminal 52. From this mains voltage, by means of the series connection of a resistor 64 and a Zener diode 65 there is formed at connection point or junction 66 a sequence of positive rectangular or square wave pulses, the pulse duration of which is the same as the duration of the positive half-wave of the mains voltage $U_N$. These pulses are supplied to an input 68 of a first monostable trigger circuit or monoflop 69 via line 67. A positive supply point 70 of the trigger circuit 69 is connected to the positive supply terminal 39 of the clock generator 27 via a line 71.

Such monostable trigger circuits 69 are known, for example, see the aforementioned textbook, "Halbleiter-Schaltungs-Technik", Chapter 8.3.

The output 72 of the first monostable trigger circuit or monoflop 69 is connected to the input 72 of a second monostable trigger circuit or monoflop 75 via a line 73. The arrangement is carried out in such a manner that the second monostable trigger circuit 75 is triggered by the negative edge of a supplied rectangular or square wave pulse. A positive supply point or terminal 76 of the monostable trigger circuit or monoflop 75 is also connected to the line 71. The negative terminals of the trigger circuits 69 and 75 are connected to the negative bus or busbar 25.

A logical signal $U_L$ appears at the output 77 of the second monostable trigger circuit 75 as a sequence of rectangular or square wave pulses, which signal $U_L$ is delivered to the output 53 of the clock generator 27 via a line or conductor 78.

A period or time span $T_V$ is defined by the logical signal $U_L$, by means of each rectangular pulse, and in each case the start of such time span is determined by the data or setting of the first monostable trigger circuit or monoflop 69 and the duration of which is determined by the data or setting of the second monostable trigger circuit or monoflop 75. As a result of the derivation of the pulses at the input 68 of the first monostable trigger circuit 69 from the mains voltage $U_N$, the start of each such period or time span $T_V$ is related to the course of the reception-side or receiver-end alternating-current mains voltage.

The start of each period $T_V$ with respect to the zero point transition or zero cross-over of the alternating-current voltage may be defined by the time settings of the monostable trigger circuit 69 and the duration may be defined by setting the time constants of the second monostable trigger circuit 75.

Figure 5:
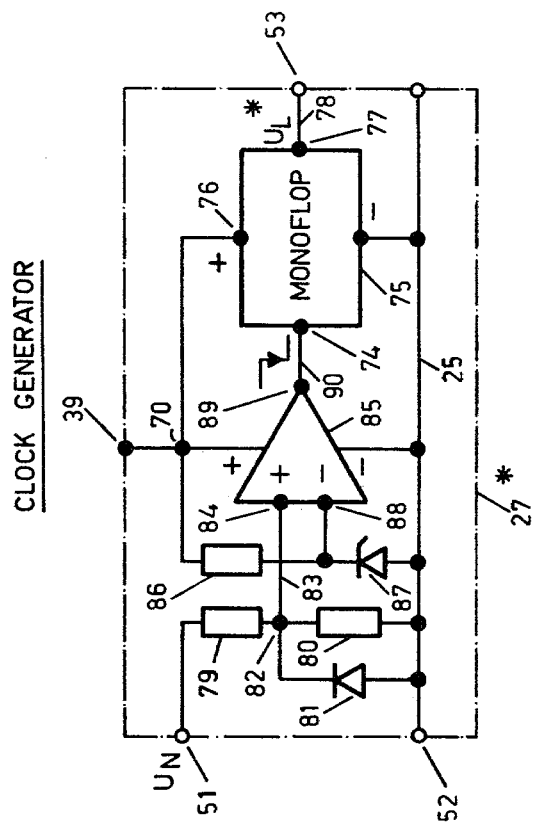
FIG. 5 shows a block circuit diagram of a second embodiment of a clock generator.

FIG. 5 shows a block diagram of a second embodiment of a clock generator. This clock generator 27* also produces a logical signal in the form of rectangular or square wave pulses having the time duration $T_V$, wherein, however, the start of each period $T_V$ is not related to a zero point transition or cross-over of the alternating-current mains voltage as in the embodiment according to FIG. 4, but here is related in each case to that instant when the instantaneous value of the mains voltage reaches a given voltage value at a given polarity.

In the following discussion the circuitry of such clock generator 27* will be described according to this second embodiment. Between the input terminal 51 and the negative terminal 52 there appears the mains voltage $U_N$. By means of a first resistor 79 connected in series with a second resistor 80 and a diode 81 which is connected in parallel with the second resistor 80, there is produced a sequence of alternating-current voltage half-waves of positive polarity at a connection point or junction 82 from the mains voltage, and thus, is supplied via a line 83 to the positive input 84 of an operational amplifier 85. From the positive supply point 70 of the clock generator 27*, a resistor 86 leads to a Zener diode 87 which delivers a defined bias voltage, with respect to the negative bus 25, to the negative or inverting input 88 of the operational amplifier 85.

The operational amplifier 85 continuously compares the voltage at its positive or non-inverting input 84 with the voltage at the negative input 88. As a result of the very high amplification or gain of the operational amplifier 85, the voltage at the output 89 of the operational amplifier 85 is positive for as long as the voltage at the input 84 is higher than that at the input 88 and is zero as long as the voltage at input 84 is lower than the voltage at input 88. It will be seen that the change in voltage at the output 89 of the operational amplifier 85 takes place whenever the instantaneous value of the mains voltage $U_N$ passes through a value defined by the voltage division caused by the resistors 79 and 80 and the voltage at input 88 of the operational amplifier 85.

The output 89 of the operational amplifier 85 is connected via a line 90 to the input 74 of a monostable trigger circuit or monoflop 75. The positive supply point 76 of the trigger circuit 75 is connected to the positive supply terminal 39 of the clock generator 27*.

A logical output signal $U_L^*$ appears at output 77 of the monostable trigger circuit or monoflop 75. This signal is delivered to the output terminal 53 of the clock generator 27* via the line 78. Rectangular or square wave pulses of time duration $T_V$ appear at the output 53 of the clock generator 27*. Thus, just as for the clock generator 27 of the embodiment of FIG. 4, the time duration $T_V$ is determined by the time-constant of the monostable trigger circuit 75, while the start of the period $T_V$ is determined in each case by the instant at which the instantaneous value of the mains voltage passes through a certain voltage value with a certain polarity.

Figure 6:
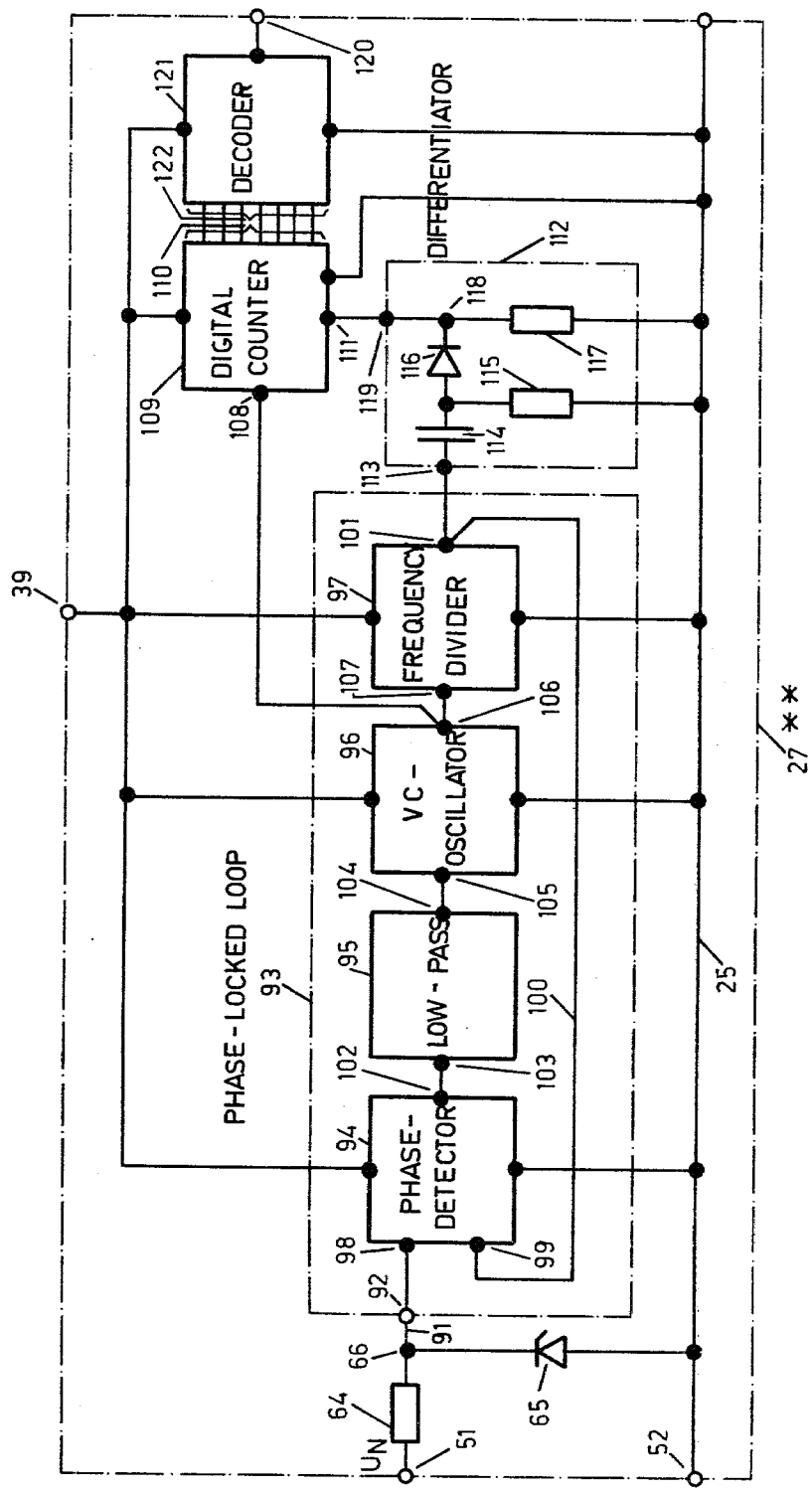
FIG. 6 shows a block circuit diagram of a third embodiment of a clock generator.

FIG. 6 shows a block circuit diagram of a third embodiment of clock generator. This clock generator 27 is constructed in digital circuit design in order to achieve a greater precision, compared to analog circuits, both for the start of the period $T^{}_V$ to be formed with regard to the course of the receiver-end alternating-current mains voltage as well as for the duration of the period or time span itself. Between the input terminal 51 and the negative terminal 52 of the clock generator 27** there is applied the mains voltage $U_N$. By means of the series connected resistor 64 and Zener diode 65 there is produced a sequence of positive rectangular or square wave pulses from the mains voltage $U_N$ at the connection point or junction 66, the duration of which is the same as the duration of the positive half-wave of the mains voltage $U_N$.

These pulses are supplied to input 92 of a conventional phase regulation circuit (phase-locked loop; PLL) 93 via a line 91. The phase locked-loop 93 comprises a phase detector 94, a low-pass filter 95, a voltage-controlled oscillator 96 and a frequency divider 97.

The phase detector 94 is supplied, on the one hand, at a first input 98 with positive rectangular or square-wave pulses, coming from connection point 66 and derived from the mains voltage $U_N$ and is supplied, on the other hand, at a second input 99 with rectangular or square wave pulses delivered by the output 101 of the frequency divider 97 via a line or conductor 100. The control or regulation signal, which is dependent on the phase difference between both input signals, appearing at the output 102 of the phase detector 94 is infed to the input 103 of the low-pass filter 95 and delivered from its output 104 as a control voltage to the control input 105 of the voltage-controlled oscillator 96. The output signal appearing at the output 106 of the voltage-controlled oscillator is supplied, on the one hand, to the input 107 of the frequency divider 97 and, on the other hand, to the clock input 108 of a digital counter 109. The divider ratio of the frequency divider 97 is thereby set so that it steps down or divides the frequency of the voltage-controlled oscillator 96 to the value of the frequency of the mains voltage $U_N$, i.e. into the frequency of the pulses at the input 98 of the phase detector 94. Pulses having this divided frequency are returned to the second input 99 of the phase detector 94 via the line 100 from the output 101 of the frequency divider 97, as has been previously explained.

The pulses supplied to the clock input 108 of the digital counter 109 are counted by such digital counter 109 and delivered at its output 110 in the form of a binary number. Thus, the counter 109 forms the binary number for the oscillations of the voltage-controlled oscillator 96 at this output 110 from the time that this counter 109 has been reset for the last time by a reset pulse applied to its reset input (RESET) 111.

This reset pulse is formed in a differentiator 112, the input 113 of which is connected to the output 101 of the frequency divider 97.

The differentiator 112 comprises an RC-member containing a capacitor 114 and a resistor 115 and also a series connected diode 116 and a resistor 117. The reset pulses generated in the differentiator 112 are removed at a junction or connection point 118 and supplied to the reset terminal 111 of the counter 109 via the output 119 of the differentiator 112.

Thus, the counter 109 is reset by each positive edge of the 50 Hz voltage. At the output 106 of the voltage-controlled oscillator 96 there is produced a voltage, the frequency of which is a multiple of the mains frequency of 50 Hz, whereby this multiple is determined by the divisor of the frequency divider 97. Thus, the aforesaid voltage is phase synchronized with the mains or network voltage $U_N$.

The frequency of the voltage-controlled oscillator 96 is selected such that, on the one hand, a required period $T^{}_V$ and, on the other hand, a certain time delay $T_D$ for the start of the period $T_V^{}$ with respect to the previous zero point transition or cross-over of the mains voltage $U_N$, are whole number or integer multiples of the cycle duration of the mains voltage. Hence, $N_1$ is the number of cycles or periods which corresponds to the mentioned time-delay $T_D$, and $N_2$ is the number of cycles which correspond to the mentioned time period or span $T_V^{**}$.

At the output 120 of the clock generator 27 there should appear a logical signal 1 as long as there lasts the time span or period $T_V^{}$. This is the case for all binary number values between $N_1$ and $N_1+N_2$ at the output 110 of the counter 109.

This is achieved by a decoder 121 which may be designed, for example, in the form of a standard read only memory (ROM or PROM) and whose truth table for all binary numbers at its input 122 which are smaller than $N_1$ takes on a zero, for all numbers between $N_1$ and $N_1+N_2$ a 1, and for all numbers greater than $N_1+N_2$ again a zero.

All negative terminals of the components 94, 95, 96 and 97 of the phase locked-loop control or phase regulation circuit 93 and base points of the differentiator 112 and also the counter 109 and the decoder 121 are connected to the negative bus 25. All positive supply points or terminals of these mentioned components are connected to the positive supply terminal 39 of the clock generator 27**.

In the following there will be described the construction and operation of two embodiments of the detector 28 of the remote control receiver 16 (FIG. 3). Before these two embodiments are described, reference should be made to the particular problems related to signal recognition.

Between the instant at which the time period $T_B$ at the transmission site starts and the time at which the remote control signal $U_F$ occurs at any reception site or receiver-end adopted in the transmitting power network, there is no certain, i.e. at any time foreseeable, correlation, due to the indeterminate possibility for change as a function of time in the conditions with regard to the mains or network structure, instantaneous load situation, and phase position in the power supply network serving the remote control signal transmission.

In a remote control system of the type concerned here, a remote control signal is detected or recognised, in known manner, at the reception side or receiver-end by comparing the voltage course of the reception-side mains voltage in a comparison period $T_V$ at zero point transitions or cross-overs of the alternating-current voltage as a result of differences which arise. Since, as mentioned above, there is no constant, or foreseeable, correlation between the transmission-side influencing period or time span $T_B$ and the period of the actual occurrence of the remote control signal $U_F$ at a certain site, it is readily possible, with a strong relationship or correlation between the reception-side comparison period $T_V$, according to the prior art, and specifically subsequent to a reception-side determined zero point transition of the alternating-current voltage at that place, for an agreement, which is not optimum, to materialize between the occurrence of the remote control signal at the reception-side and the thus assumed comparison period. Experience has even shown that in many practically inadmissible cases, the occurrence of the remote control signal is missed due to an unsuitable position of the comparison period $T_V$.

In order to overcome this disadvantage at least one of the following measures is therefore undertaken according to the invention:

1. The instant at which the comparison period $T_V$ starts is located before the instant of zero point transitions or zero cross-overs of the reception-side alternating-current voltage which is to be monitored.

2. The duration of the comparison period is selected to be greater than half the transmission-side or transmitter-end influencing period $T_B$.

3. The start of the comparison period $T_V$ is related to the temporal course of the reception-side or receiver-end mains voltage before the zero point transition to be monitored.

4. The start of the comparison time period $T_V$ is related to one zero point transition preceeding the zero point transition to be monitored, of the reception-side alternating-current voltage.

5. The start of the comparison period $T_V$ is related to a certain reference variable of the instantaneous value of the reception-side alternating-current voltage with a given polarity.

6. The start of the comparison period $T_V$ is connected to the reception-side course of the alternating-current voltage before the zero point transition of the same to be monitored according to one or more of the previous measures 1 to 5 using a defined time delay $T_D$.

7. The time delay $T_D$ and/or the comparison period $T_V$ is established in a certain ratio to the cycle duration of the alternating-current mains voltage.

These measures may be realised, as may be seen, by using a suitable embodiment of the previously described clock generator 27 or 27* or 27**.

The logical signal $U_L$ delivered by a thus selected embodiment of the clock generator 27 or 27* or 27** is used as a clock signal for the periodic release of the detector 28 (FIG. 3).

A first embodiment of the detector 28 will now be described with reference to FIG. 7. As mentioned, the reception-side or receiver-end occurring remote control signal $U_F$ is recognised by comparing the reception-side voltage course at zero point transitions of the reception-side alternating-current voltage in certain periods $T_V$, or $T_V{}^*$ or $T_V{}^{**}$. During this period, the then occurring voltage is, for example, integrated. The integration value or result is temporarily stored and compared with corresponding integration results of previous corresponding periods, whereby the occurrence of the remote control signal $U_F$ is recognised or detected by virtue of the differences which arise.

Figure 7:
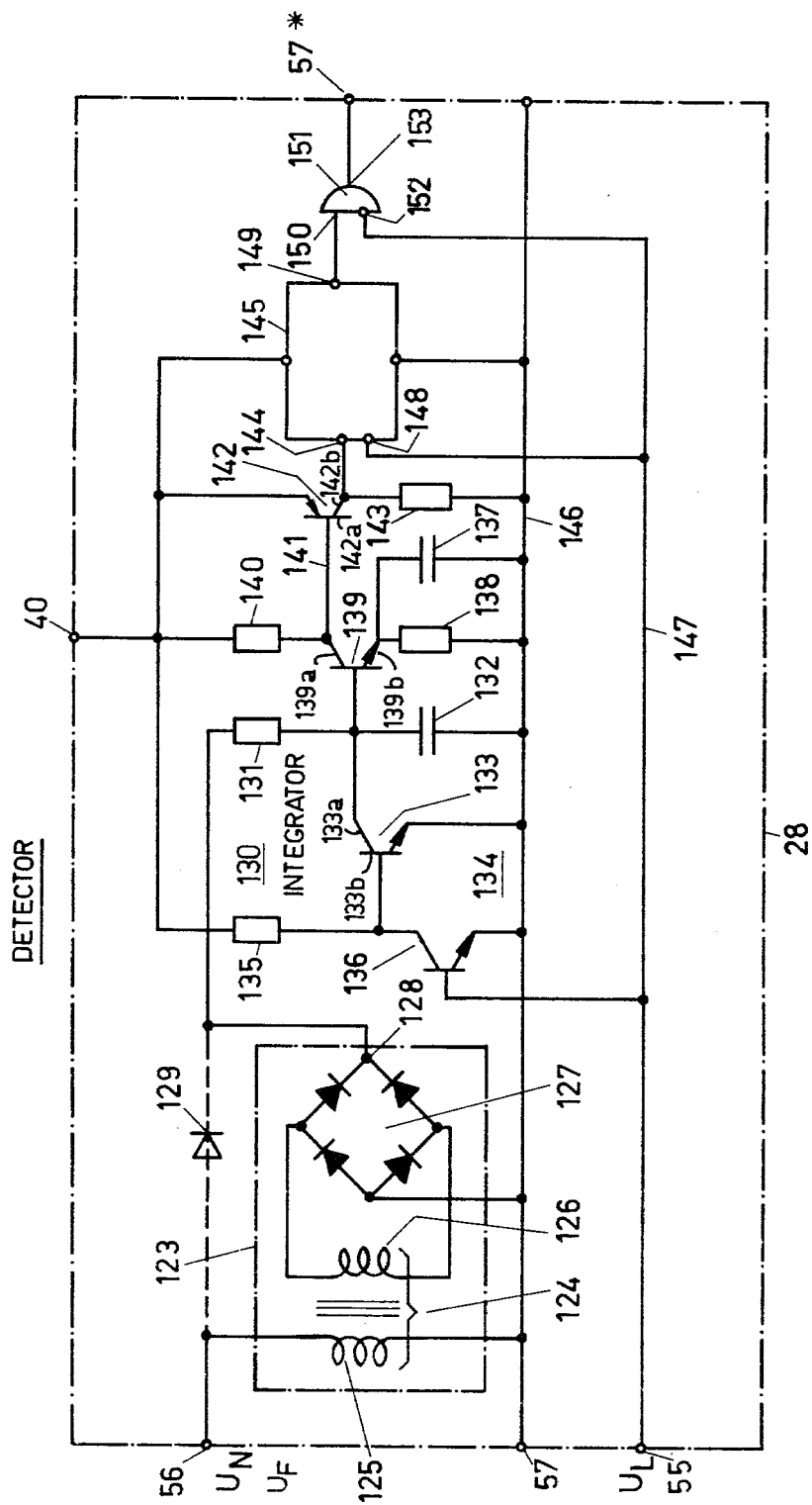
FIG. 7 shows a block circuit diagram of a first embodiment of a detector.

A detector 28 according to the construction of FIG. 7 is suitable for cases in which during the relevant time period or span, the instantaneous value of the reception-side alternating-current voltage may have both positive as well as negative values. i.e. when, during the mentioned period, a zero point transition or zero cross-over actually occurs. It is then necessary to undertake the mentioned comparison not directly with the alternating-current voltage itself, but following its rectification, because otherwise, for reasons of symmetry, the result could be zero with or without a signal.

If the integration time is selected such that the zero point transition of the alternating-current voltage takes place during the period $T_V$ or $T_V{}^*$ or $T^{**}V$, then the mains or network voltage $U_N$, or part of the same, is positioned between the input terminal 56 (FIG. 3) and the negative terminal 57 (FIG. 3) and is rectified in a full-wave rectifier 123 (FIG. 7). The full-wave rectifier 123 comprises a transformer 124 with a primary winding 125 and a secondary winding 126 after which there is connected a full-wave rectifier 127. The rectified alternating-current voltage to be integrated appears at the output terminal 128 of the rectifier 123 during the period or time span $T_V$, or $T^*V$ or $T^{**}V$.

If the integration period or time span is set at times such that it always lies in front of or behind a zero point transition, then the full-wave rectifier 123 could be omitted, or could be replaced by a half-wave rectifier 129 shown by the dashed lines in FIG. 7. The full-wave rectifier 127 may also be replaced, for example, by another full-wave rectifier, as for example by a known operational amplifier, fed-back via diodes.

The integrator 130 connected to the output 128 is formed by a resistor 131 and a capacitor 132. In the strictly mathematical sense, this is indeed not a perfect integrator, but as long as the voltage at the capacitor 132 is much smaller than the voltage between the terminals 128 and 57, the approximation to integration adequately suffices for the present purpose.

Connected parallel to the capacitor 132 is the collector path 133a of a transistor 133 which short-circuits the capacitor 132 with a conductive state of the transistor 133, and thus, prevents integration, or cancels the results thereof, represented by the charge of the capacitor 132.

The base 133b of the transistor 133 is controlled by an inverter 134 composed of a resistor 135 and a transistor 136. This inverter 134 can be dispensed with when using an appropriate design of the clock generator 27.

In a capacitor 137, there is stored the result in each case of a previous integration, whereby of course a parallel resistor 138 provides for temporal reduction in this result, i.e. of the charging voltage of the capacitor 137.

If the voltage in the capacitor 132 towards the end of the integration time, i.e. towards the end of the comparison period $T_V$ or $T^*V$, or $T^{**}V$, is greater than the charging voltage of the capacitor 137 at that time, then the collector path 139a of a transistor 139 connected forwardly of the capacitor 137 becomes conductive and the capacitor 137 is recharged via a resistor 140 from the positive supply terminal 40. By appropriately choosing the circuit elements, it can be ensured that only a practically negligible fraction of the charge of the capacitor 132 is required.

If a remote control signal $U_F$ of the mentioned type is superimposed upon the mains voltage $U_N$, this has the effect that the integration result i.e. the voltage at the capacitor 132 becomes smaller than the voltage at the capacitor 137 which arises from a normal zero transition of the alternating-current voltage, i.e. without an impressed remote control signal $U_F$.

Consequently, during this period, the transistor 139 does not become conductive, i.e. the capacitor 137 is not recharged and the line 141 leading to the base 142a of a transistor 142 still conducts the potential of the supply terminal 40. Thus, the transistor 142 is blocked or non-conductive, so that by means of a collector resistor 143 the collector 142b of the transitor 142 and along therewith the input 144 of a subsequently connected flip-flop 145 connected with the transistor collector 142b, are at the zero potential of the negative bus 146.

If, however, no remote control signal $U_F$ is superimposed upon the mains voltage $U_N$ with a thus monitored zero point transition, then as a result of the thus higher integration result, the capacitor 132 is charged to a higher voltage than the instantaneous charging voltage of the capacitor 137 because the capacitor 137 has lost its charge via the resistor 138 since its last recharge, and therefore, its charging voltage has slightly decreased.

Therefore, as soon as the actual voltage appearing at the capacitor 132 exceeds that appearing at the capacitor 137 (the voltage difference between the emitter 139b and base 139c of the transistor 139 here is neglected) the transistor 139 becomes conductive. As a result, the potential of the line 141 becomes lower than the supply voltage at the supply terminal 40. However, as a result of this the transistor 142 become conductive and a pulse is produced at the input 144 of the flip-flop 145, which commences at the start of the recharge and then stops when the logical signal $U_L$, which is supplied to the other input 148 of the flip-flop 145 of the clock generator 27 (FIG. 3) from the terminal 55 via a line 147, is again zero.

A so-called set/reset flip-flop is used as the flip-flop 145 which has the following characteristics: the "reset" is dominant with respect to the "set", and both "set" and "reset"-inputs 144 and 148 may be controlled by positive pulse edges.

A first input 150 of an AND-gate 151 is connected to the output 149 of the flip-flop 145, the second input 152 of such AND-gate 151 is an inverting input and receives the logical signal $U_L$ at the terminal 55, via the line 147. The output 153 of the AND-gate 151 is connected to the output terminal 57* of the detector 28.

FIG. 8 shows a block circuit diagram of a further embodiment of detector. In this FIG. 8, the detector 28* comprises a full-wave rectifier 123 or a half-wave rectifier 129, just like the detector 28 according to the embodiment of FIG. 7. The rectified alternating-current voltage to be integrated during the period $T_V$ or $T^*V$ or $T^{**}V$ appears at the output terminal 128 of the rectifier 123 or 129, as the case may be.

The circuit section between transistor 139 and the output 153 of the AND-gate 151 corresponds to the corresponding circuit section of the clock generator 28 according to FIG. 7. Therefore, the corresponding description will not be here repeated.

However, with this clock generator 28\* according to FIG. 8, the integrator of the clock generator 28 is replaced by a so-called Miller-integrator 154. The rectified alternating-current voltage to be integrated is supplied to the Miller-integrator 154 from the output 128 of the rectifier 123 via the resistor 131 to the negative-input 155 of an operational amplifier 156 powered by symmetrical direct-current voltage.

The symmetrical direct-current voltage supply of the operational amplifier 156 is shown in FIG. 8, on the one hand, by the connection of the positive supply point of the operational amplifier 156 to the positive supply terminal 40 and, on the other hand, by a battery 157. It should be obvious that this battery 157 may be replaced by a corresponding design of the current supply component 26 (FIG. 3).

The operational amplifier 156 is feedback coupled in known manner between its output 158 and its negative input 155 by means of a capacitor 159 in order to achieve the Miller effect.

A field-effect transistor 160 is connected to both terminals of the capacitor 159, as shown. The control input 161 of the field-effect transistor is connected to the output of the inverter composed of a resistor 162 and a transistor 163 and constituting the output of the clock generator 27.

Thus, the Miller integrator 154 which has been described above represents an equivalent solution for the integrator of the detector 28 according to the arrangement of FIG. 7.

While there are shown and described present preferred embodiments of the invention, it is to be distinctly understood that the invention is not limited thereto, but may be otherwise variously embodied and practiced within the scope of the following claims.

Accordingly, What we claim is:

1. A method of producing, transmitting and recognising a signal in a remote control system having a transmitter-end and a receiver-end, comprising the steps of:
producing a remote control signal by intentionally influencing the course of the voltage at the transmitter-end during an influencing period at a region of said voltage course around at least one zero point transition of the alternating-current mains voltage at the transmitter-end;
impressing the remote control signal thus produced upon said alternating-current mains voltage;
transmitting said remote control signal to the receiver-end;
detecting the occurrence of such remote control signal at the receiver-end by comparing the course of the receiver-end alternating-current mains voltage at a region around a zero point transition with said course in a previous such transition region; and
accomplishing such comparision operation such that it commences in each case before an expected theoretical zero point transition of the alternating-current mains voltage.

2. The method as defined in claim 1, further including the steps of:
relating the instant at which the comparison period starts to the course of the receiver-end alternating-current mains voltage before the relevant comparison period.

3. The method as defined in claim 1, further including the steps of:

relating the instant at which the comparison period starts to a predetermined periodically recurring point of the alternating-current mains voltage curve which is defined by at least any one of its voltage value, its polarity, its phase or combinations thereof.

4. The method as defined in claim 3, further including the steps of:
delaying the start of the comparison periods by a certain time-delay with respect to the occurrence of each such recurring point.

5. The method as defined in claim 3, further including the steps of:
relating the instant at which the comparison period starts to a temporal average of several recurring points.

6. The method as defined in claim 5, further including the steps of:
delaying the instant at which the comparison period starts with respect to said temporal average.

7. The method as defined in claim 4, further including the steps of:
utilizing a time-delay having a fixed value.

8. The method as defined in claim 1, further including the steps of:
making the receiver-end comparison period at least approximately equal to one-half of the transmitter-end influencing period.

9. The method as defined in claim 8, further including the steps of:
integrating during the comparison period the receiver-end alternating-current mains voltage occurring at that time.

10. The method as defined in claim 1, further including the steps of:
making the duration of the receiver-end comparison period correspond to at least approximately the duration of the transmitter-end influencing period.

11. The method as defined in claim 10, further including the steps of:
integrating during the comparison period the presently occurring alternating-current mains voltage half-waves of one polarity.

12. The method as defined in claim 9 or 11, further including the steps of:
comparing the integration values of various comparison periods with one another; and
detecting the occurrence of such a remote control signal due to differences arising in the integration values.

13. An apparatus for signal recognition in a remote control system, comprising:
a receiver-end containing a remote control receiver;
said remote control receiver comprising a clock generator for controlling a definite receiver-end comparison period, the position of which as a function of time is dependent upon the course of the receiver-end alternating-current mains voltage;
integrating means controlled by said clock generator for starting integration of the receiver-end alternating-current mains voltage at a definite time period before an expected theoretical zero transition of the receiver-end alternating-current mains voltage and for terminating integration of said receiver-end alternating-current mains voltage at the end of said definite time period; and
means for evaluation of the integration results as remote control signals and for determination of the significance of said remote control signals.

14. The apparatus as defined in claim 13, wherein:

said clock generator is structured such that it is triggered by a zero point transition of the receiver-end alternating-current mains voltage which is located in front of the zero point transition to be monitored.

15. The apparatus as defined in claim 13, wherein:
the clock generator is triggered in relation to a recurring voltage value at a given polarity of the instantaneous value of the receiver-end alternating-current mains voltage.

16. The apparatus as defined in claim 13, wherein:
said clock generator comprises digital circuitry responsive to binary signals; and
at least the start, of the comparison period formed by the clock generator is established in rellation to the receiver-end mains frequency.

17. The apparatus as defined in claim 13, wherein:
the clock generator comprises digital circuitry responsive to binary signals; and at least the start of the comparison period formed by the clock generator is established in relation to the average of the receiver-end frequency as a function of time.

18. The apparatus as defined in claim 13, wherein:
said remote control receiver further comprising rectifier means for rectifying the receiver-end alternating-current mains voltage to be monitored; and
a detector containing said integrating means and controlled by said clock generator and connected downstream of said rectifier means.

19. The apparatus as defined in claim 13, wherein:
said clock generator comprises digital circuitry responsive to binary signals; and
at least the duration of the comparison period formed by the clock generator is established in relation to the receiver-end mains frequency.

20. The apparatus as defined in claim 13, wherein:
said clock generator comprises digital circuitry responsive to binary signals; and
both the start and the duration of the comparison period formed by the clock generator is established in relation to the receiver-end mains frequency.

21. The apparatus as defined in claim 13, wherein:
the clock generator comprises digital circuitry responsive to binary signals; and
at least the duration of the comparison period formed by the clock generator is established in relation to the average of the receiver-end frequency as a function of time.

22. The apparatus as defined in claim 13, wherein:
the clock generator comprises digital circuitry responsive to binary signals; and
both the start and the duration of the comparison period formed by the clock generator is established in relation to the average of the receiver-end frequency as a function of time.

* * * * *